United States Patent
Hasegawa et al.

(10) Patent No.: US 7,171,128 B2
(45) Date of Patent: Jan. 30, 2007

(54) OPTICAL SIGNAL RECEIVING MODULE, OPTICAL SIGNAL RECEIVER AND OPTICAL FIBER COMMUNICATION EQUIPMENT

(75) Inventors: Shuichi Hasegawa, Yokohama (JP); Atsushi Miura, Yokohama (JP); Toshiaki Ozaki, Yokohama (JP); Hironari Matsuda, Yokohama (JP); Hiroki Irie, Fujisawa (JP)

(73) Assignee: OpNext Japan, Inc., Yokohama (JP)

( * ) Notice: Subject to any disclaimer, the term of this patent is extended or adjusted under 35 U.S.C. 154(b) by 988 days.

(21) Appl. No.: 10/215,947

(22) Filed: Aug. 9, 2002

(65) Prior Publication Data
US 2003/0081297 A1 May 1, 2003

(30) Foreign Application Priority Data
Oct. 25, 2001 (JP) .............................. 2001-327631

(51) Int. Cl.
*H04B 10/06* (2006.01)
(52) U.S. Cl. ................... 398/202; 398/209; 398/164
(58) Field of Classification Search ............ 398/209, 398/186, 202, 164
See application file for complete search history.

(56) References Cited

U.S. PATENT DOCUMENTS

| | | | | |
|---|---|---|---|---|
| 4,207,459 A | * | 6/1980 | Nakamura et al. | 398/186 |
| 5,200,612 A | | 4/1993 | Moriya et al. | |
| 5,907,422 A | * | 5/1999 | Ho et al. | 398/209 |
| 6,895,190 B1 | * | 5/2005 | Neumann et al. | 398/202 |

FOREIGN PATENT DOCUMENTS

| | | |
|---|---|---|
| JP | 63-224406 A | 9/1988 |
| JP | 06-216663 A | 8/1994 |
| JP | 06-291293 A | 10/1994 |
| JP | 11-183758 A | 7/1999 |
| JP | 2000-058881 | 2/2000 |

\* cited by examiner

*Primary Examiner*—David C. Payne
(74) *Attorney, Agent, or Firm*—Townsend and Townsend and Crew LLP

(57) ABSTRACT

On a chip carrier, on a printed circuit board or in a pre-amplifier circuit, a resistor or an impedance is connected to either or both of the anode side and the cathode side of a photo detector. A bypass capacitor of bias power supply for photo detector is grounded either directly or via a resistor or an impedance.

3 Claims, 11 Drawing Sheets

OPTICAL SIGNAL RECEIVING MODULE, OPTICAL SIGNAL RECEIVER AND OPTICAL FIBER COMMUNICATION EQUIPMENT

BACKGROUND OF THE INVENTION

The present invention relates to optical fiber communication equipment, an optical signal receiver and an optical signal receiving module.

An optical signal receiver may consist, for instance as shown in FIG. 1, an optical signal receiving module 100, an automatic gain control (AGC) amplifier circuit 40 for carrying out equalizing amplification, a decision circuit 41 for converting the amplified analog signals into digital signals and supplying them, and a re-timing circuit 42 for performing clock regeneration. The optical signal receiving module 100 consists of optical components such as a photo detector, a pre-amplifier circuit, a bias circuit for photo detector, optical fibers and a lens. In FIG. 1, illustration of optical components including optical fibers is omitted. Regarding the AGC amplifier circuit 40, it may be included in the optical signal receiving module 100 or, if the gain of a pre-amplifier circuit 10 is sufficient, the AGC amplifier 40 will be unnecessary. Furthermore, where the dynamic range required for reception sensitivity is narrow, a simple amplifier circuit having no AGC function may be used.

The principal performance of the optical signal receiver is dominated by the input equivalent noise current and frequency characteristic of the optical signal receiving module 100. Both these input equivalent noise current and frequency characteristic are characteristics in the high frequency region. In an optical signal receiving module for high speed optical transmission, the influence of parasitic elements attributable to the mounted state of a photo detector 1, the pre-amplifier circuit 10 and a photo detector bias circuit 30' is particularly large. Parasitic elements in the optical signal receiving module 100 include parasitic inductances and parasitic capacitances related to the connection or mounting of the photo detector 1, the pre-amplifier circuit 10 and the photo detector bias circuit 30'. Usually, in order to reduce parasitic elements related to connection such as inductances, it is desirable to connect the photo detector 1 and the pre-amplifier circuit 10 in mutually as close positions as practicable. In other words, it is necessary to keep the parasitic inductances attributable to the connection of the photo detector 1 and the pre-amplifier circuit 10, capacitances including the junction capacitance of the photo detector 1 and the input terminal capacitance of the pre-amplifier circuit, and the resonance frequency of LC resonance based on the parasitic capacitance sufficiently high relative to the transmission frequency band even where the transmission band is expanded with an increase in transmission speed. In order to reduce the parasitic inductance attributable to the connection of the photo detector 1 and the pre-amplifier circuit 10, the bonding lead length between the photo detector 1 and the pre-amplifier circuit 10 should be shortened. For instance, JP-A-58881/2000 discloses a technique for reducing parasitic inductances by mounting the photo detector and the pre-amplifier circuit on the same chip carrier.

Generally, photo detectors and pre-amplifier circuits are devices susceptible to fluctuations in characteristics. For this reason, the photo detector part and the pre-amplifier circuit part are separately screened. Then, only the components that have passed the screening are assembled, and the yield of acceptable optical signal receiving modules can be significantly enhanced thereby. Also, if data on the temperature-dependence of a photo detector are required, the data will have to be obtained for the photo detector alone. For instance, where an avalanche photo diode (APD) is used as a photo detector, because the temperature-dependence of the breakdown voltage or the dark current differs from one APD to another, data acquisition for the photo detector alone is indispensable. In the structure described in JP-A-58881/2000 cited above, it is difficult to evaluate the photo detector as an isolated chip. On the other hand, a configuration in which a photo detector is mounted on the chip carrier side and a pre-amplifier circuit on the printed circuit board is disclosed in, for instance, the U.S. Pat. No. 5,200,612. In this configuration, no other active element than the photo detector is mounted on the chip carrier side, and therefore, the photo detector part can be screened. However, this would entail a greater length of the lead for connecting the photo detector and the pre-amplifier circuit with a consequence of an increase in the parasitic inductances noted above.

Also, for the optical signal receiving module, the following requirements are specified to achieve a prescribed level of reception sensitivity:

(1) The return loss of the received optical signals should be kept at or below a certain level (for instance, not more than −27 dB according to the ITU-T standard) to maximize the coupling efficiency of the photo detector and the optical fiber;

(2) The density of the input equivalent noise current of the pre-amplifier circuit should be minimized:

(3) In connection with (2) above, the junction capacitance of the photo detector should be minimized; and (4) The frequency response characteristics should be optimized relative to circuits downstream.

Regarding the frequency response characteristics mentioned in (4) above, S parameters S21 and S22 after photo electric conversion should satisfy respectively prescribed requirements. While depending on the characteristics of circuits downstream, usual S parameter requirements for operation at 10 Gbits/s of NRZ signal as transmission code are, for the S21 characteristic, (A) 3 dB band$\geq$7 GHz and (B) intra-band deviation $\leq\pm1$ dB, and for the S22 characteristic, (C) S22$\leq$−7 dB (at 10 GHz). These S21 characteristic and S22 characteristic suppose the use of port 1 as the optical signal input terminal and port 2 as the electrical signal output terminal. In a configuration in which the photo detector is mounted on the chip carrier and the pre-amplifier circuit is mounted on the printed circuit board, as described above, the characteristics of (A) and (B) stated above are significantly affected by the relationship between the parasitic inductance arising as a result of the connection of the two elements and other parasitic capacitances. The technique disclosed in JP-A-2000-58881 is intended to improve these characteristics by mounting the photo detector and the amplifier circuit on the chip carrier and thereby shortening the lead for connecting them and accordingly reducing the resultant parasitic inductances. However, there is a limit to the reduction of parasitic inductances, which can never be reduced to zero. The cited patent application does not state what is to be done when peaking or dipping of S21 has arisen in a frequency band where the characteristic is affected by LC resonance occurring between this inductance and capacitance.

FIG. 3 shows an equivalent circuit around the chip carrier of an optical signal receiving module. In this diagram, reference numeral 1 denotes a photo detector; 10, a pre-amplifier circuit; 11, a bypass capacitor; 25, the input capacitance of the pre-amplifier circuit; 30, a bias power supply for photo detector; 31, a parasitic inductance due to the bonding wire between the bypass capacitor 11 and the electrode pattern of the bias power supply; 32, parasitic inductance due to the bonding wire between the bypass capacitor 11 and a pattern on the chip carrier; 33, the junction capacitance of the photo detector; and 34, a parasitic inductance due to the bonding wire between the pre-amplifier circuit 10 and the pattern on the chip carrier. A reduction in parasitic elements accountable for these parasitic inductances would be effective for enhancing the frequency characteristic. It is conceivable, for instance, to mount both the photo detector 1 and the pre-amplifier circuit 10 on the chip carrier to shorten the bond wiring length and thereby to reduce the parasitic inductances. However, without evaluating the photo detector 1 part in a separate state from re-amplifier circuit 10, no initial trouble with the photo detector 1 can be detected by screening. For a configuration in which both the photo detector 1 part and the pre-amplifier circuit 10 are mounted on the chip carrier, any module defect would be found in a subsequent process, and this would bring down the productivity of modules, to avoid which the photo detector should be mounted on the chip carrier and the pre-amplifier circuit, on the printed circuit board.

Problems to be solved by the present invention, in view of the state of the related art described above, include: (1) how to free even an optical signal receiving module, wherein the photo detector and the pre-amplifier circuit are not mounted on the chip carrier and accordingly parasitic elements cannot be reduced, from peaking and dipping and provide it with frequency characteristics in the necessary and sufficient band, and (2) how to make it possible to suppress peaking or dipping in accordance with the results of advance evaluation of a photo detector and a pre-amplifier circuit whose characteristics differ from wafer to wafer or from one process lot to another, limit the band of frequency characteristics to prevent it from becoming too wide, and thereby to prevent circuit noise components from increasing and the reception sensitivity from deteriorating.

SUMMARY OF THE INVENTION

The present invention can provide a technique that permits solution of these problems.

In order to solve the problems noted above, according to the invention, there is provided an optical signal receiving module in which a photo detector is arranged on a chip carrier (first printed circuit board) and a pre-amplifier circuit is arranged on a printed circuit board (second printed circuit board), wherein a resistor or an impedance consisting of resistance component and reactance component is connected to at least either of the anode side and the cathode side of the photo detector on the chip carrier, on the printed circuit board or in the pre-amplifier circuit. Also, a bypass capacitor of bias power supply for photo detector is grounded either directly or via series resistor or impedance. Thus: (1) a resistor or an impedance for controlling a frequency band of a signal in a module to improve a frequency characteristic of an output of a pre-amplifier circuit is connected to at least either of the anode side and the cathode side of a photo detector; (2) a resistor or an impedance for controlling a frequency band of a signal in a module to improve a frequency characteristic of an output of a pre-amplifier circuit is connected to at least either of the anode side and the cathode side of a photo detector, and on at least either of the chip carrier side and the printed circuit board side; (3) a resistor or an impedance for controlling a frequency band of a signal in a module to improve a frequency characteristic of an output of a pre-amplifier circuit is connected to at least either of the anode side and the cathode side of a photo detector, and all or some of at least the resistors connected to the anode side are formed in an input unit within the pre-amplifier circuit as part of the circuit; (4) a first impedance for controlling a frequency band of a signal in a module to improve a frequency characteristic of an output of a pre-amplifier circuit is connected to at least either of the anode side and the cathode side of a photo detector, and a second impedance for adjusting a frequency band of a signal within a module is connected in series to a bypass capacitor constituting a bypass circuit between a bias power supply circuit for the photo detector and the ground; and (5) a first impedance for controlling a frequency band of a signal in a module to improve a frequency characteristic of an output of a pre-amplifier circuit is connected to either or both of the anode side and the cathode side of a photo detector and arranged on either or both of the chip carrier side and the printed circuit board, and a second impedance for controlling a frequency band of a signal within a module is connected to a bypass capacitor in series.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Preferred embodiments of the present invention will now be described below with reference to accompanying drawings. In the following description, the optical signal receiving modules embodying the invention are supposed to be intended for high speed wide band optical signal receivers transmitting signals at an ultra-high speed of 10 Gbits/s or more.

Figure 2:
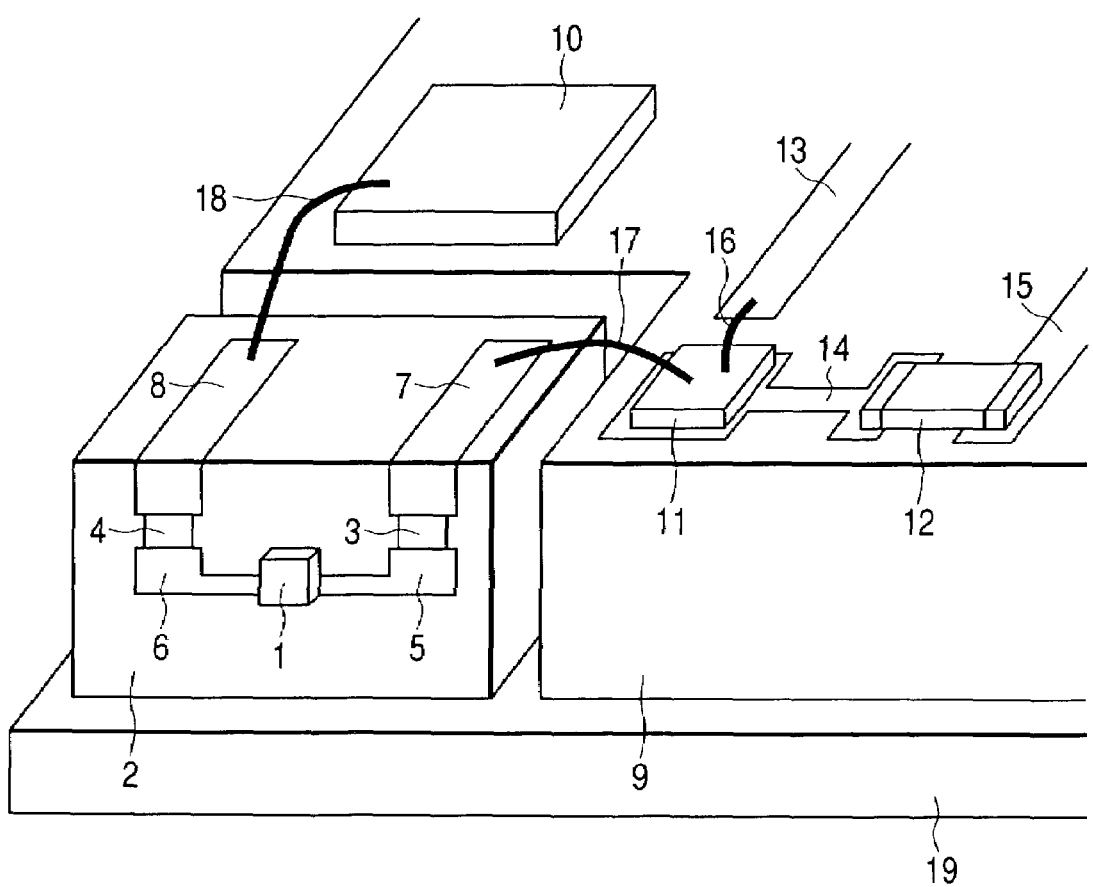
FIG. 2 shows an optical signal receiving module, which is a first preferred embodiment of the present invention.
Figure 3:
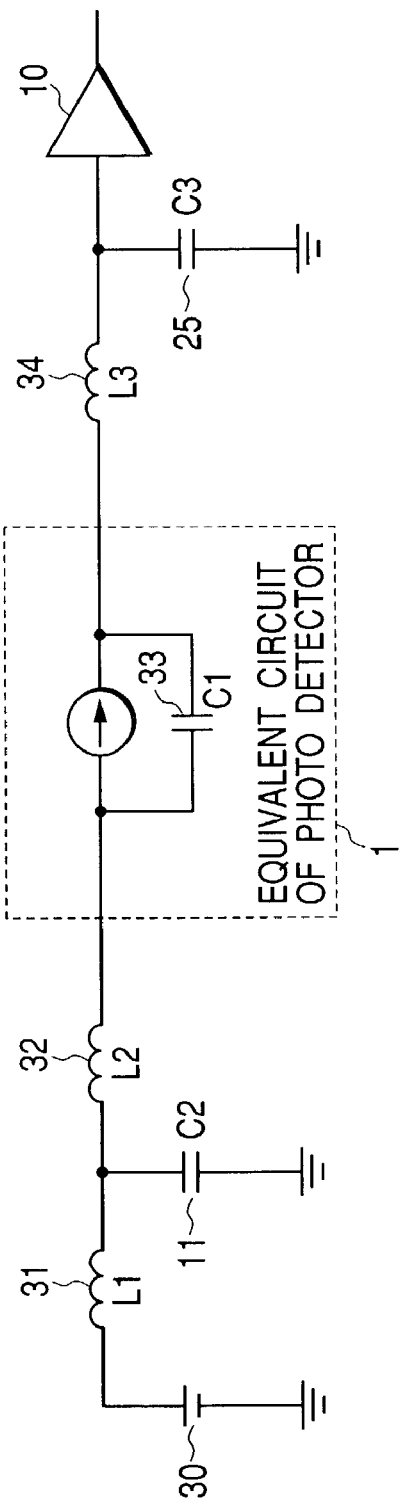
FIG. 3 shows an example of configuration of an equivalent circuit in an optical signal receiving module.
Figure 4:
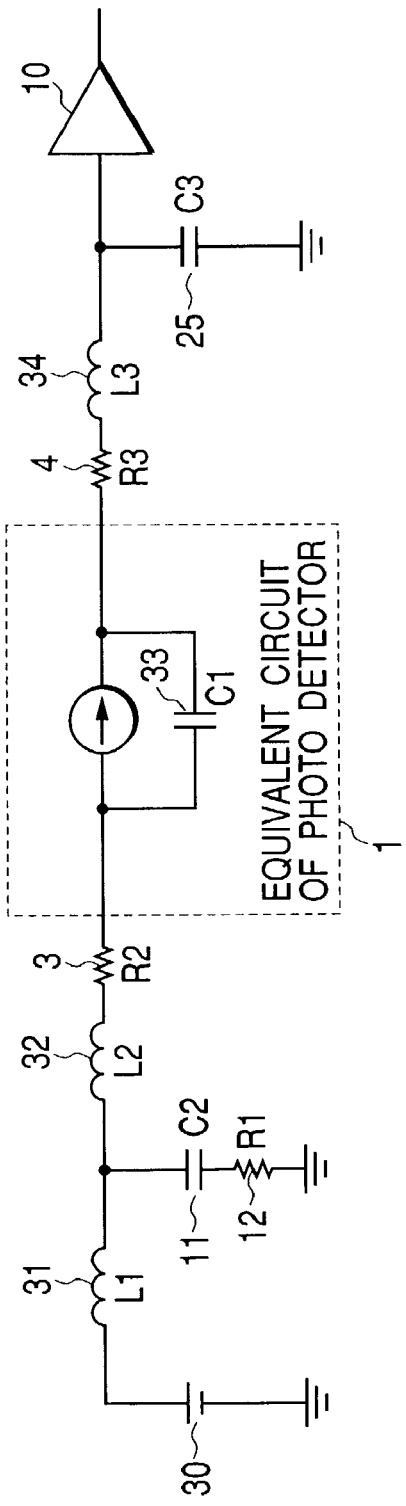
FIG. 4 shows an example of configuration of an equivalent circuit in the optical signal receiving module of FIG. 2.

FIG. 2, FIG. 4 and FIG. 5 through FIG. 8 illustrate a first preferred embodiment of the invention. FIG. 2 shows a perspective view of the configuration of an optical signal receiving module; FIG. 4, an equivalent circuit around a photo detector in the configuration shown in FIG. 2; and FIG. 5 through FIG. 8 illustrate the characteristics of S21 among S parameters. This embodiment uses a configuration in which a resistor for controlling the frequency band of intra-module signals is provided on the chip carrier side. In FIG. 2 and FIG. 4, illustration of optical components for guiding optical signals to the optical signal receiving plane of the photo detector, including an optical fiber and a lens, is omitted.

In FIG. 2, reference numeral 1 denotes a photo detector; 2, a chip carrier; 9, a printed circuit board; 10, a pre-amplifier circuit; 11, a bypass capacitor; 3, a resistor connected to the cathode; 4, a resistor connected to the anode; 5 through 8, printed connecting patterns; 12, a series resistor connected between the bypass capacitor 11 and the ground; 13, a pattern of connection to the bias power supply for photo detector; 14, a printed connecting pattern for connecting the bypass capacitor 11 and the series resistor 12; 15, a pattern of connection to the ground; 16 through 18, bonding wires; and 19, the ground (metallic case) of the optical signal receiving module. Illustration of the output of the pre-amplifier circuit 10 is omitted for the sake of simplification. This applies to the subsequent embodiments of the invention as well.

Figure 9:
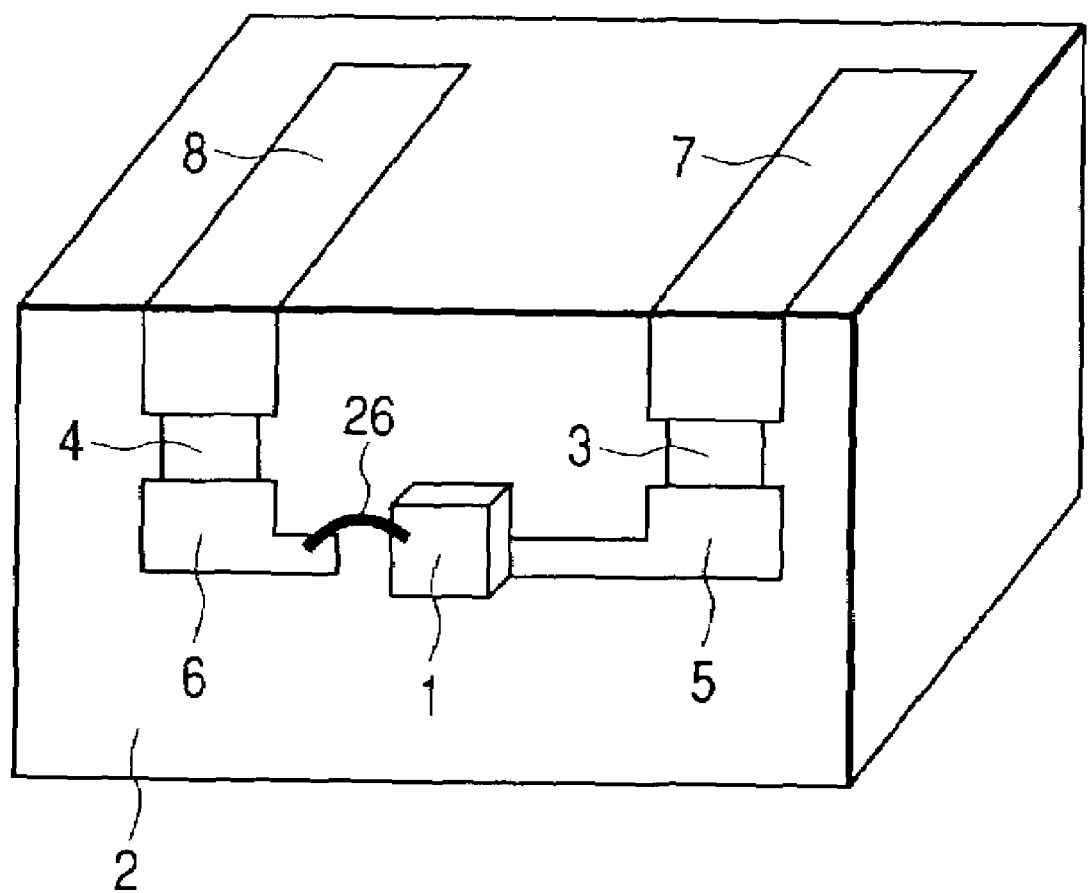
FIG. 9 illustrates a variation of the chip carrier part in the embodiment of the invention.

In this embodiment, the chip carrier 2 is an aluminum nitride substrate, and the printed circuit board 9 is a ceramic substrate. The printed connecting patterns 5 through 8, the cathode-connected resistor 3 and the anode-connected resistor 4 of the chip carrier 2 are formed by a printing technique. On the other hand, the series resistor 12 of the printed circuit board 9 is a chip resistor. The cathode of the photo detector 1 is connected to the printed connecting pattern 5, and the anode of the same is connected to the printed connecting pattern 6. This connection may be accomplished either by providing bonding terminals on the other side than the optical signal receiving plane and connecting them to the printed connecting patterns 5 and 6 as shown in FIG. 2 or to the printed connecting pattern 5 of the chip carrier from the back side of the chip on the ground side and to the printed connecting pattern 6 from an electrode on the chip surface via a bonding wire 26 on the anode side as shown in FIG. 9. To the printed circuit board 9 are also adhered the pre-amplifier circuit 10 and the bypass capacitor 11, and the series resistor 12 is connected to it, too. On the printed circuit board 9 are formed in advance the bias power supply connecting pattern 13 for photo detector, the printed connecting pattern 14 and the ground connection pattern 15 by plating, vapor deposition, printing or some other film formation technique. The bias power source, being connected in parallel by the bonding wire 16 and the bonding wire 17 to the bypass capacitor 11 and the printed connecting pattern 7 on the chip carrier, supplies a bias voltage to the cathode of the photo detector 1 via the cathode-connected resistor 3, and is also connected to the ground connection pattern 15 via the bypass capacitor 11 and the series resistor 12. The pre-amplifier circuit 10, being connected by the bonding wire 18 to the printed connecting pattern 8, is connected to the anode of the photo detector 1 via the anode-connected resistor 4 on the chip carrier 2. Further, the ground connection pattern 15 is connected to the ground 19 of the package by a through hole, wire or some other means. The ground 19 serves as a high frequency ground for all the electrodes.

When the optical signal receiving plane of the photo detector 1 is irradiated with an optical signal from an optical component in such a configuration in a state in which bias power is supplied to the photo detector 1 from a bias power supply source for photo detector, the photo detector 1 converts the optical signal into an electrical signal, and supplies this electrical signal from the anode side to the pre-amplifier circuit 10 side via the printed connecting pattern 6, the anode-connected resistor 4, the printed connecting pattern 8 and the bonding wire 18. In this pre-amplifier circuit 10, the entered electrical signal is amplified, and the amplified signal is supplied to the regenerating circuit side downstream and the re-timing circuit side. Both the electrical signal supplied from the photo detector 1 and the amplified output signal supplied from the pre-amplifier circuit 10 have necessary and sufficient bands as prescribed.

FIG. 4 shows an equivalent circuit around the photo detector in the configuration of FIG. 2.

In FIG. 4, reference numeral 1 denotes the photo detector; 10, the pre-amplifier circuit; 11, the bypass capacitor; 12, the series resistor; 30, the bias power supply for photo detector; 31, the parasitic inductance due to the bonding wire 16 mentioned above; 32, the parasitic inductance due to the bonding wire 17 mentioned above; 3, the cathode-connected resistor mentioned above; 33, the junction capacitance of the photo detector; 4, the anode-connected resistor mentioned above; 34, the parasitic inductance due to the bonding wire 18 mentioned above; and 25, the input capacitance of the pre-amplifier circuit 10. Among the parasitic elements on the cathode side of the photo detector 1, the parasitic inductance 31, the parasitic inductance 32, and the junction capacitance of the photo detector constitute main elements affecting the frequency characteristics of the optical signal receiving module according to the invention. Strictly speaking, there also are parasitic inductances and parasitic capacitances due to the printed connecting pattern 5, the printed connecting pattern 7, and the bias power supply connecting pattern 13 for photo detector, but their discussion is omitted here because they are small in value and accordingly little affect the frequency characteristics. On the other hand, parasitic elements on the anode side of the photo detector 1 include the parasitic inductance 34 due to the bonding wire 18 and the input capacitance 25 of the pre-amplifier circuit 10 constitute main elements affecting the frequency characteristics of the optical signal receiving module according to the invention. Strictly speaking again, there also are parasitic inductances and parasitic capacitances due to the printed connecting pattern 6 and the printed connecting pattern 8; however, their discussion is omitted here, too, because they are small in value and accordingly little affect the frequency characteristics.

FIG. 5 through FIG. 8 are graphs illustrating examples of frequency characteristic (optical/electrical (O/E) conversion) transmission characteristic S21) in the equivalent circuit of FIG. 4. In each of these graphs, the horizontal axis represents the frequency logarithmically, and the longitudinal axis represents the S21 characteristic in dB terms.

Here, in a series resonance circuit formed of the cathode-connected resistor 3 (R2 in resistance) on the chip carrier 2, the parasitic inductance 32 (L2 in inductance) due to the bonding wire 17 and the junction capacitance 33 (C1 in static capacitance) of the photo detector 1, the value of quality factor (Q) is represented by:

$$Q = 1/\{R2 \cdot (L2/C1)^{1/2}\} \qquad \text{(Equation 1)}$$

wherein an increase in the value of R2 brings down that of Q. As a result, peaking and dipping of the frequency characteristic attributable to this resonance decrease. On the other hand, in a configuration in which no cathode-connected resistor 3 is provided for instance, strictly speaking, the Q value is raised by very small resistance components of wiring patterns and bonding wires, resulting in increased peaking and dipping.

Figure 5:
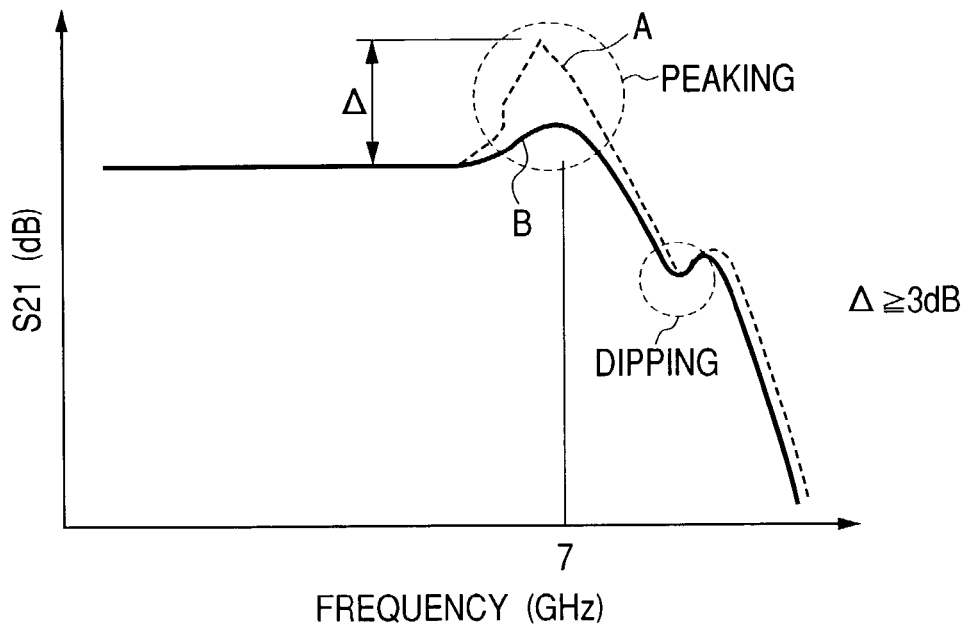
FIG. 5 is a graph showing the transmission characteristic of the optical signal receiving module of FIG. 1.

FIG. 5 shows an example of frequency characteristic where the cathode-connected resistor 3 is connected. In this graph, A represents the characteristic in a case in which neither the cathode-connected resistor 3 nor the anode-connected resistor 4 is connected, and B, that in a case in which only the cathode-connected resistor 3 is connected. As a result of the drop in Q value ensuing from the connection of the cathode-connected resistor 3, peaking and dipping in the prescribed band are reduced. Of this characteristic, the peak of the salient volume Δ in the prescribed frequency band is significant reduced from the previous 3 dB or more.

Similarly, in a series resonance circuit formed of the anode-connected resistor 4 (R3 in resistance) on the chip carrier 2, the parasitic inductance 34 (L3 in inductance) due to the bonding wire 18 and the input capacitance 25 (C3 in static capacitance) of the pre-amplifier circuit 10, the Q value is represented by:

$$Q=1/\{R3 \cdot (L3/C3)^{1/2}\} \quad \text{(Equation 2)}$$

wherein an increase in the value of R3 brings down that of Q. As a result, peaking and dipping of the frequency characteristic attributable to this resonance decrease.

Figure 6:
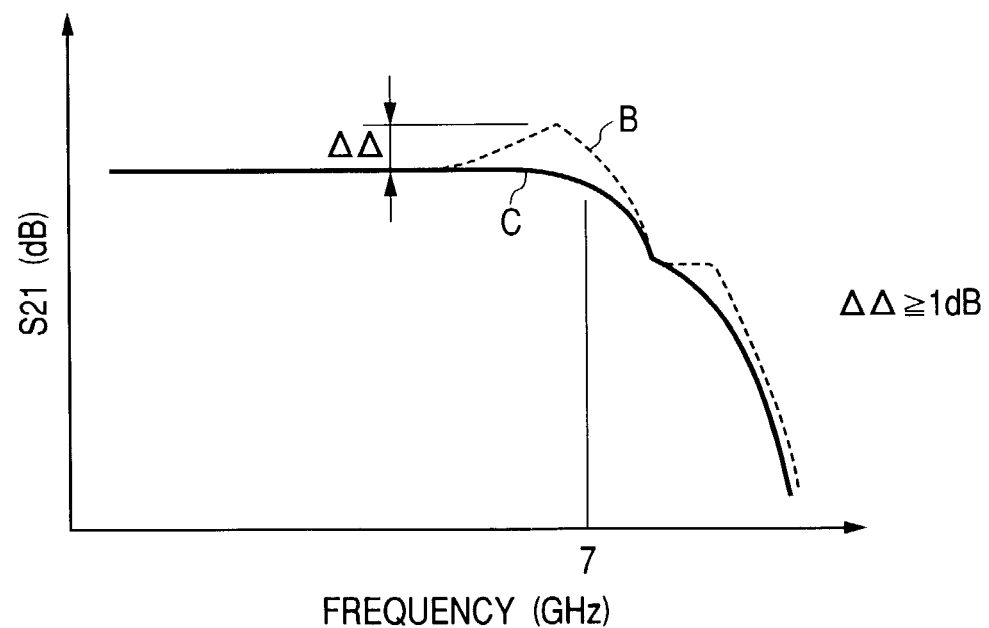
FIG. 6 is another graph showing the transmission characteristic of the optical signal receiving module of FIG. 1.

FIG. 6 shows a frequency characteristic (C in the graph) where both the cathode-connected resistor 3 and the anode-connected resistor 4 mentioned above are connected. Reference sign B denotes the characteristic in a case where only the cathode-connected resistor 3 is connected. Where both the cathode-connected resistor 3 and the anode-connected resistor 4 are connected, the Q value is even lower than in the case where either the cathode-connected resistor 3 or the anode-connected resistor is connected because the resistance increases, resulting a decrease in peaking and dipping within the band. In this example of characteristic, where only the cathode connected resistor 3 is connected, the salient volume ΔΔ in the prescribed frequency band is reduced to almost 0 dB from the previous 1 dB or more.

By connecting a resistor or resistors to both or either of the cathode side and the anode side of the photo detector as described above, it is made possible to reduce peaking or dipping of S21 due to the LC resonance caused by parasitic inductances and accordingly to flatten the frequency characteristic.

As a result, restrictions regarding the bonding wire 16, the bonding wire 17 and the bonding wire 18 are reduced to significantly increase the freedom of structural designing of the optical signal receiving module.

Figure 7:
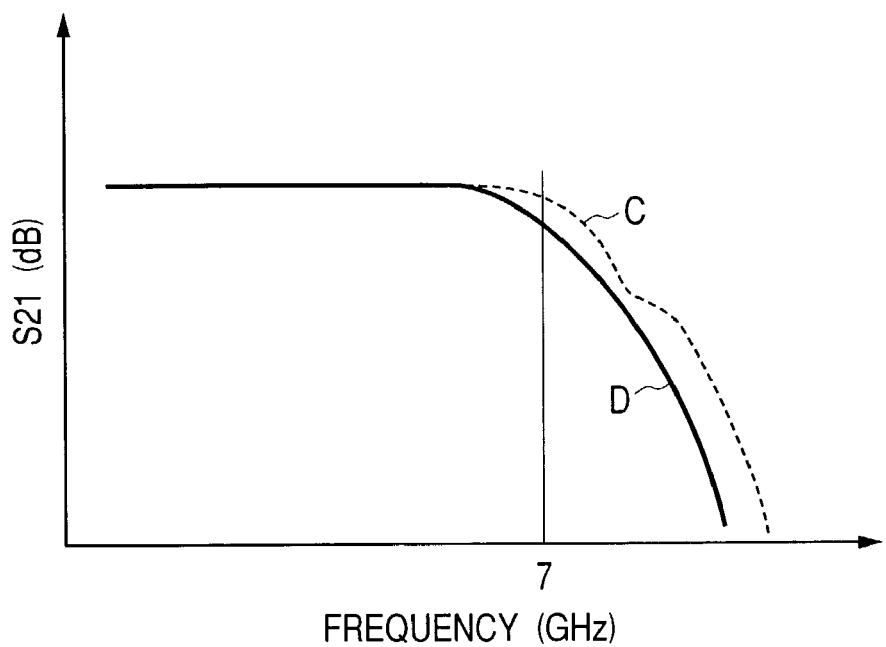
FIG. 7 is still another graph showing the transmission characteristic of the optical signal receiving module of FIG. 1.

FIG. 7 shows a frequency characteristic (D in the graph) in a case wherein the cathode-connected resistor 3, the anode-connected resistor 4 and the series resistor 12 (R1 in resistance) are connected. Reference sign C denotes the characteristic in a case where only the cathode-connected resistor 3 and the anode-connected resistor 4 are connected. The connection of the series resistor 12 results in a control in the direction of narrowing the frequency bandwidth. Where the frequency band is excessively wide, this configuration is effective for improvement against a deterioration in reception sensitivity and other adverse effects of an increase in circuit noise components. In this example, a frequency band having expanded to 7 GHz or even more is narrowed to a prescribed improved bandwidth. In the optical signal receiving module of 10 Gbits/s, though S21 as the frequency characteristic requires 7 GHz or more as stated above, from the viewpoint of avoiding high frequency noise, an excessively wide band of 10 GHz or more is expected to affect the transmission characteristic. Roughly speaking, peaking and dipping within 15 GHz are out of the band and undesirable.

Figure 8:
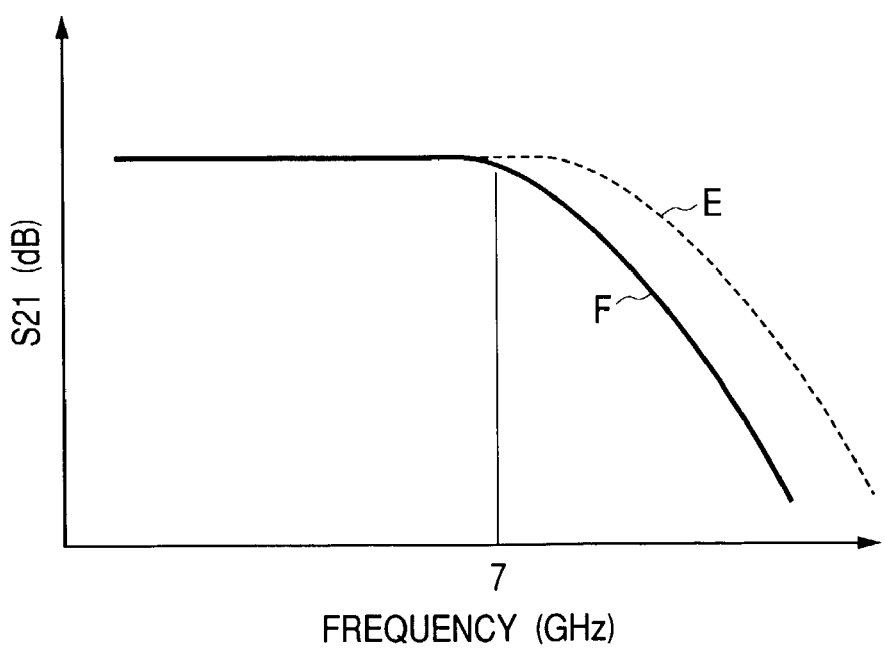
FIG. 8 is yet another graph showing the transmission characteristic of the optical signal receiving module of FIG. 1.

FIG. 8 shows an example of measured result (F in the graph) of the frequency characteristic in a case where the resistor 4 (R3) connected to the anode of the photo detector us added to a receiver module having an excessively wide frequency band. Reference sign E denotes an example in which the frequency band is excessively wide. By connecting either or both of the cathode connected resistor 3 and the anode-connected resistor 4, the frequency band can be limited to a required band. Before the change of this resistor, the frequency band was 11 GHz, too wide for the transmission of 10 Gbits/s, but the necessary and sufficient bandwidth of 7 GHz can be obtained by selecting an appropriate resistance level.

The above-described embodiment permits evaluation of basic characteristics in a state in which the photo detector 1 is mounted on the chip carrier 2. It is also made possible, in accordance with the result of such evaluation, to flatten the frequency characteristic by reducing with the cathode-connected resistor 3 or the anode-connected resistor 4 peaking or dipping due to the LC resonance attributable to parasitic inductances within the module, increase the band width and there by secure a prescribed band. If the band is excessively wide, the bandwidth can be narrowed to an appropriate width using either the cathode-connected resistor 3 or the anode-connected resistor 4. Peaking and dipping can also be suppressed by grounding via the series resistor 12 the bypass capacitor 11 of the bias power supply to the photo detector, and excessive widening of the band can be prevented to keep the circuit noise components from increasing and thereby to prevent reception sensitivity from deteriorating.

Figure 10:
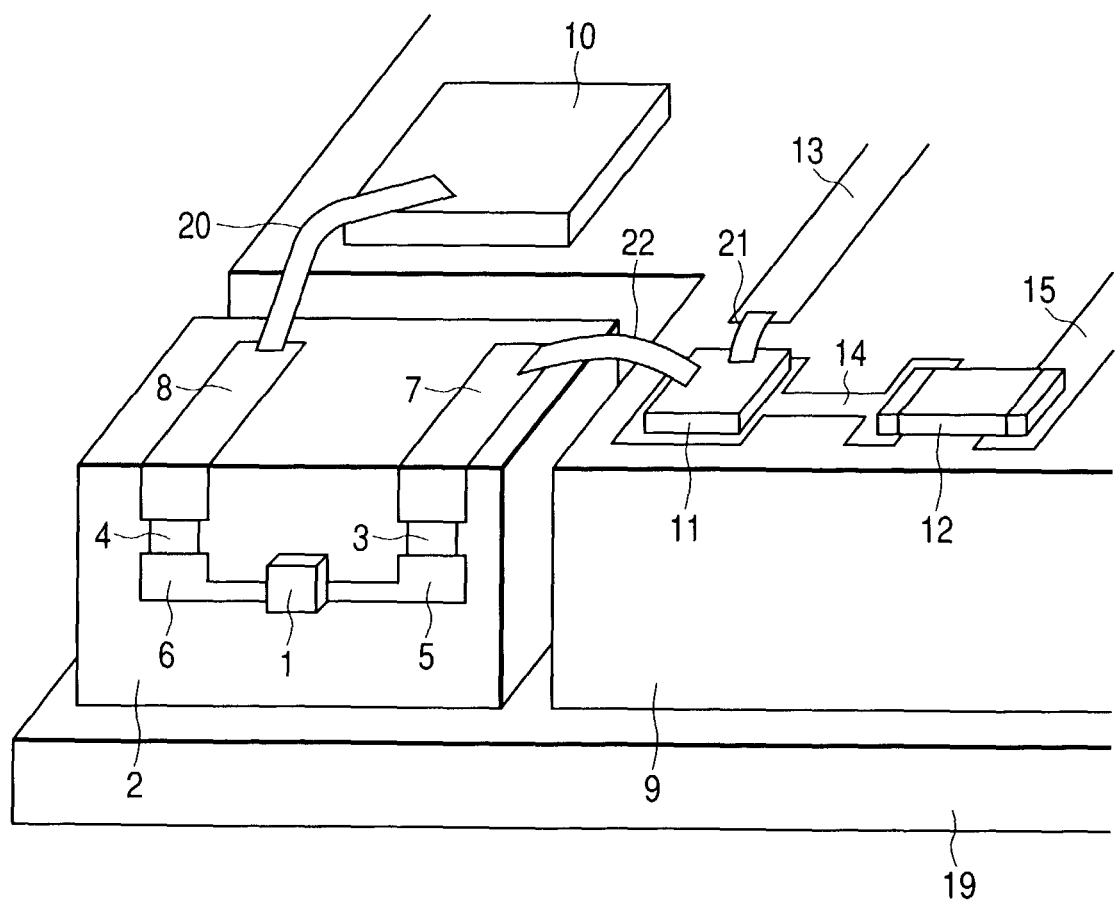
FIG. 10 shows an optical signal receiving module, which is a second preferred embodiment of the invention.
Figure 11:
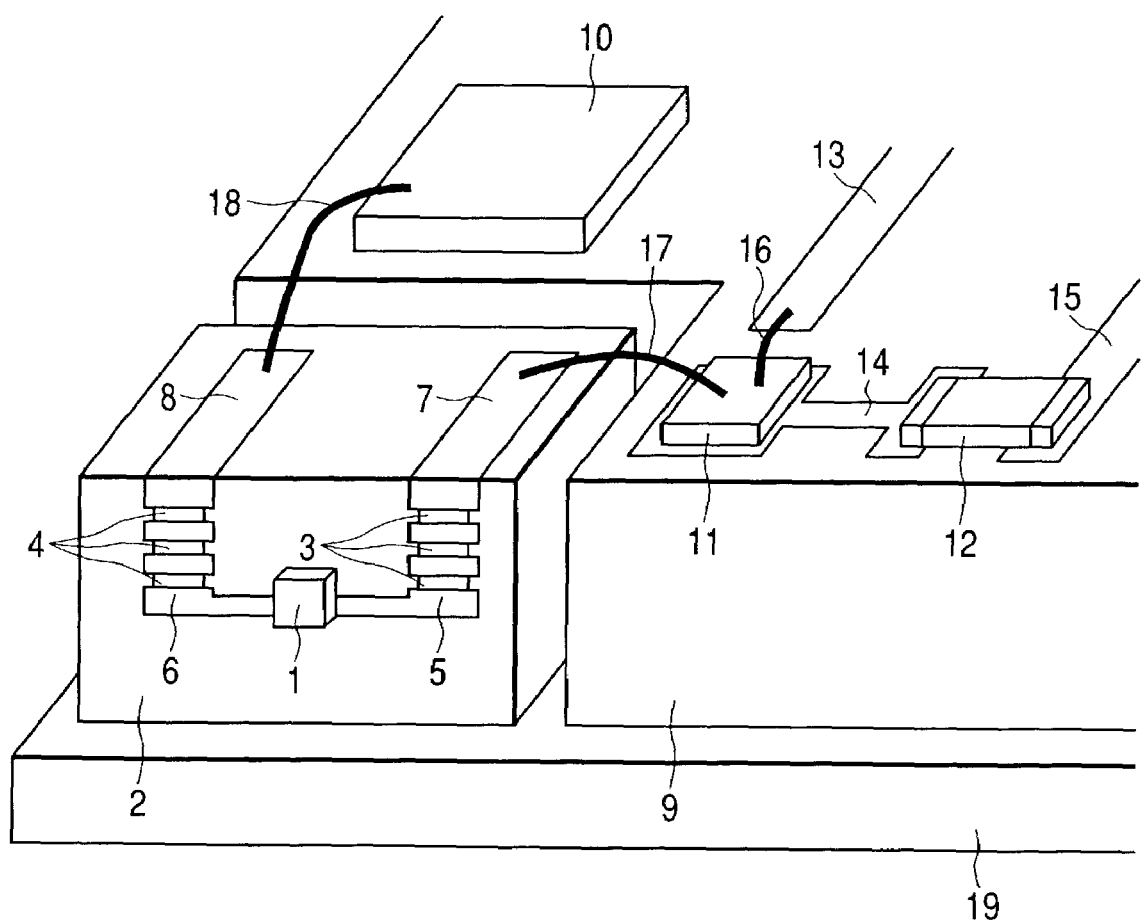
FIG. 11 shows an optical signal receiving module, which is a third preferred embodiment of the invention.
Figure 12:
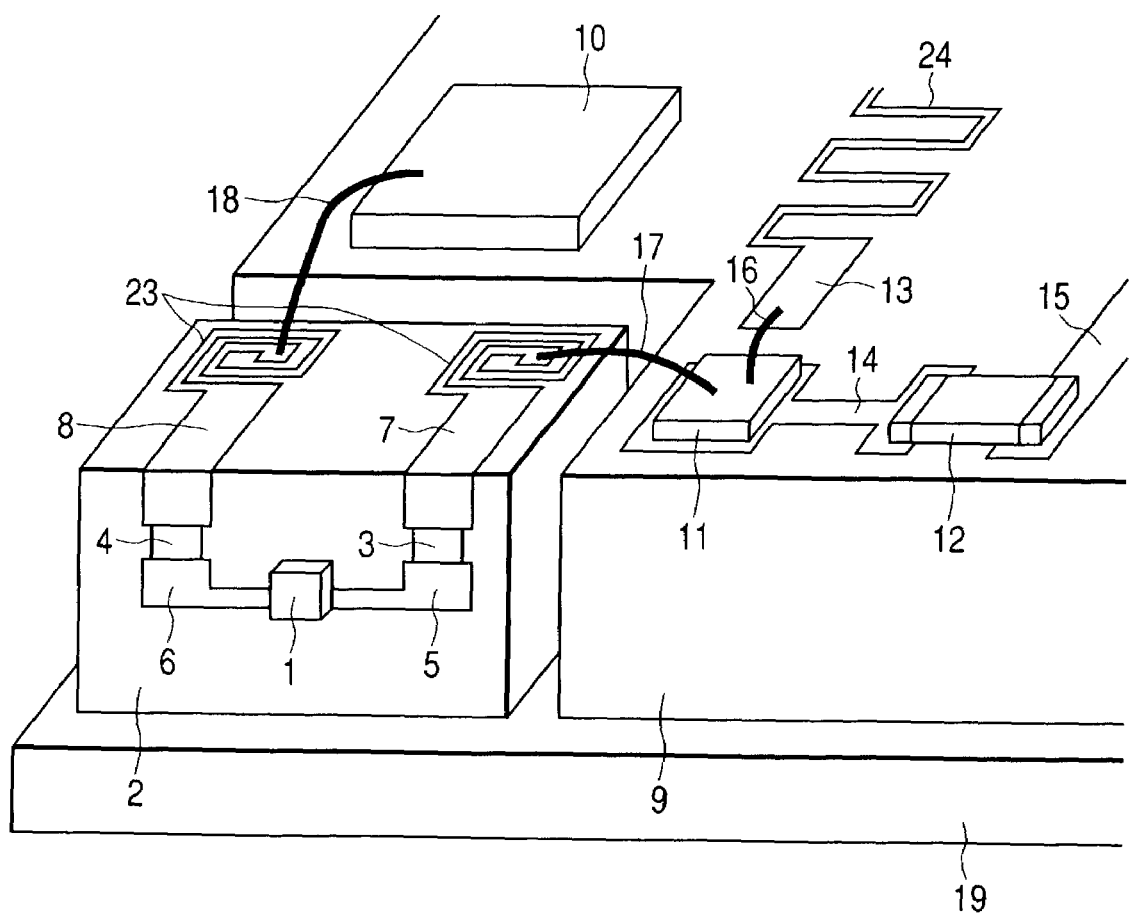
FIG. 12 shows an optical signal receiving module, which is a fourth preferred embodiment of the invention.

FIG. 10 through FIG. 12 illustrate other preferred embodiments of the present invention in which the cathode-connected resistor 3 and the anode-connected resistor 4 are provide on the photo detector-mounted plane of the chip carrier 2. The optical signal receiving module shown in FIG. 10 is a second embodiment of the invention; that in FIG. 11, a third embodiment of the invention; and that shown in FIG. 12, a fourth embodiment of the invention. In any of these embodiments, the cathode-connected resistor 3 and the anode-connected resistor 4 are printed resistors. If the trend of fluctuation is checked in advance by measuring characteristics and otherwise in the production of the photo detector 1 before it is mounted on the chip carrier 2, the resistances of the cathode-connected resistor 3 and the anode-connected resistor 4 on the mounting plane of the photo detector 1 can be kept within an appropriate range by trimming or selection when the photo detector 1 is mounted on the chip carrier 2.

In the configuration shown in FIG. 10, the chip carrier 2 and the pre-amplifier circuit 10, the chip carrier 2 and the bypass capacitor 11, and the bypass capacitor 11 and the bias power supply connecting pattern 13 for photo detector are respectively connected by gold (Au) ribbon-shaped bonding wires 20, 21 and 22. The configuration is the same in other respects as what is shown in FIG. 2. Connection of these components by the gold (Au) ribbon-shaped wires can serve to reduce parasitic inductances attributable to connection, and can make up for a shortage in frequency band. In other respects, this embodiment provides the same advantages as the first embodiment described above does.

In the configuration shown in FIG. 11, each of the cathode-connected resistor 3 connected to the photo detector and the anode-connected resistor 4 is composed by connecting a plurality of resistors in series. Between the individual resistors connected in series, there are provided connecting conductors. In other respects, this configuration is the same as that shown in FIG. 2. In this configuration, the cathode-connected resistor 3 and the anode-connected resistor 4 can be controlled to respectively appropriate resistances by selectively short-circuiting, as required, some of the connecting conductors to each other. In other respects, this embodiment provides the same advantages as the first embodiment described above does.

In the configuration shown in FIG. 12, spiral patterns are formed in part of the printed connecting pattern 7 and part of the printed connecting pattern 8 to constitute spiral inductors 23 in the patterned parts, and the bias power supply connecting pattern 13 is patterned in a meander line 24. In other respects, this configuration is the same as that shown in FIG. 2. This configuration is effective for enhancing the inductance level to narrow the frequency band when it is too wide. An appropriate inductance level can be achieved by altering the pattern lengths and shapes of the spiral inductors 23 the meander line 24. Thus, no separate inductance element needs to be connected. In other respects, this embodiment provides the same advantages as the first embodiment described above does.

Figure 13:
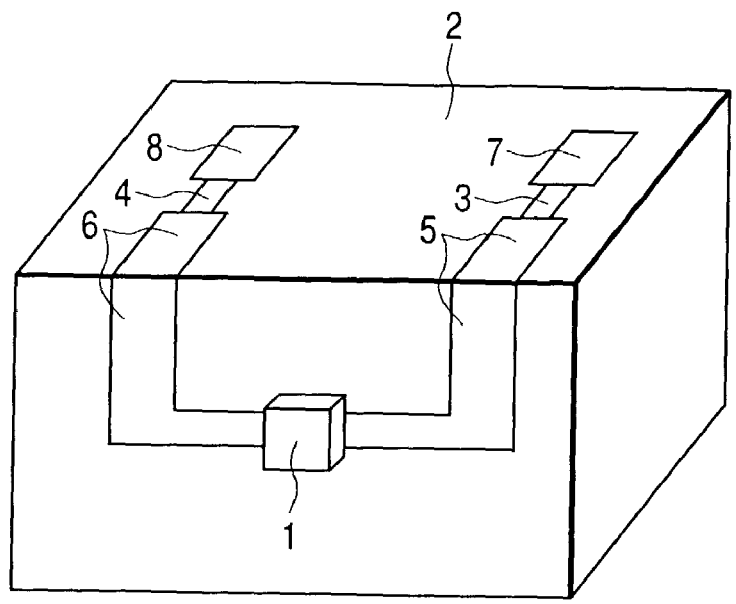
FIG. 13 illustrates a variation of the chip carrier part in some embodiments of the invention.
Figure 14:
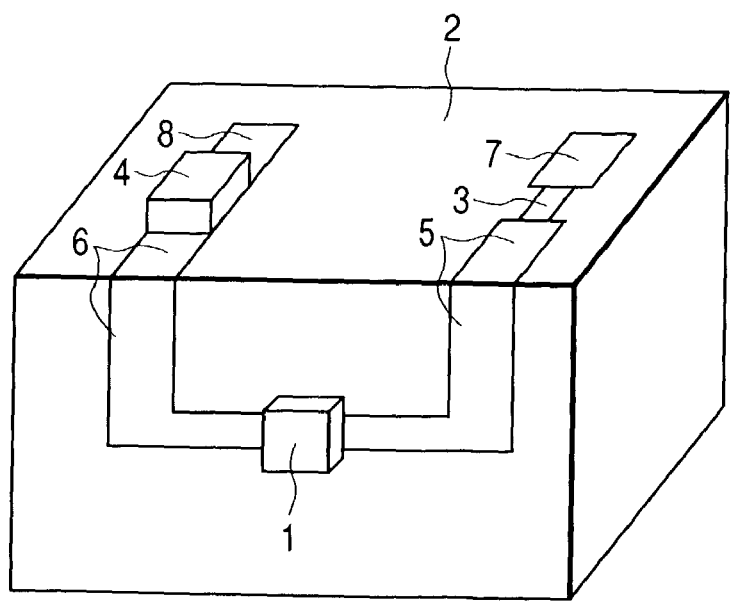
FIG. 14 illustrates another variation of the chip carrier part in other embodiments of the invention.

FIG. 13 and FIG. 14 illustrate variations of the chip carrier for use in the first through fourth preferred embodiments of the invention. In each of these variations, the cathode-connected resistor 3 and the anode-connected resistor 4 are provided on the plane of the chip carrier 2 on which the printed connecting patterns 7 and 8 are formed. In FIG. 13, the cathode-connected resistor 3 and the anode-connected resistor 4 are printed resistors, while in FIG. 14, the anode-connected resistor 4 is a chip resistor and the cathode-connected resistor 3 is a printed resistor. The providing of either or both of the cathode-connected resistor 3 and the anode-connected resistor 4 on the same plane as the printed connecting pattern 7 or the printed connecting pattern 8 on the chip carrier 2 as shown in FIG. 13 or FIG. 14, can easily accomplish measurement of the characteristics of the pre-amplifier circuit 10 and the adjustment of the cathode-connected resistor 3 and the anode-connected resistor 4 on the basis of the measured result even in a state in which the chip carrier 2 and the pre-amplifier circuit 10 are built into the printed circuit board or a case. As a result, fluctuations in the frequency response characteristic of the pre-amplifier circuit 10 or in the resistances of the cathode-connected resistor 3 and the anode-connected resistor 4 arising in the manufacturing process can be integrally suppressed in the built-in state and, combined with a reduction in the rejection rate of components, this can contribute to shortening the time taken for the manufacture of modules. Especially where either or each of the cathode-connected resistor 3 and the anode-connected resistor 4 is composed of a plurality of resistors as shown in, for instance, FIG. 11 cited above, the adjustment of the resistances is further facilitated. Or where a chip resistor is used as shown in FIG. 14, choice of a chip resistor chip resistor of high resistance accuracy would make possible precision adjustment of the characteristics of the module. In other respects, these arrangements provide the same advantages as the first embodiment described above does.

Figure 15:
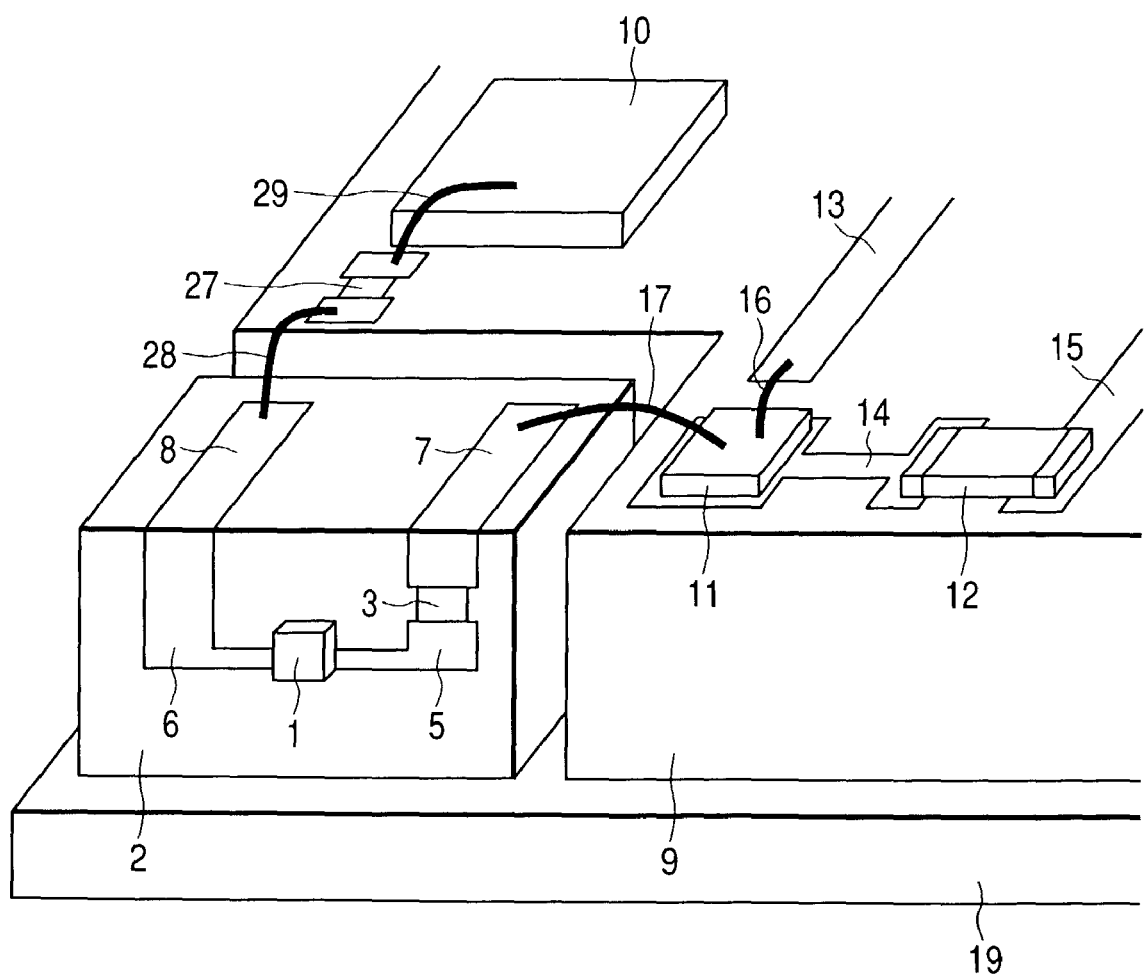
FIG. 15 shows an optical signal receiving module, which is a fifth preferred embodiment of the invention.

FIG. 15 shows an optical signal receiving module, which is a fifth preferred embodiment of the invention, wherein an anode-connected resistor is provided on the printed circuit board 9 and a cathode-connected resistor is provided on the chip carrier 2. The cathode-connected resistor 3 and the anode-connected resistor 27 are formed of printed resistors. In the diagram, reference numeral 28 denotes a bonding wire connecting the printed connecting pattern 8 and the anode-connected resistor 27; and 29, a bonding wire connecting the anode-connected resistor 27 and the pre-amplifier circuit 10. In this configuration, the pre-amplifier circuit 10 and the anode-connected resistor 27 can be combined within the printed circuit board 9, and characteristics can thus be evaluated in a state in which they are combined. In other respects, this embodiment provides the same advantages as the first embodiment described above does. Incidentally in the configuration shown in this FIG. 15, the anode-connected resistor 27 out of the cathode-connected resistor 3 and the anode-connected resistor 27 is provided on the printed circuit board 9. However, both the anode-connected resistor 27 and the cathode-connected resistor 3 may as well be provided on the printed circuit board 9, or only the cathode-connected resistor 3 may be provided on the printed circuit board 9. Further in each of these alternative arrangements, either or both of the cathode-connected resistor 3 and the anode-connected resistor 27 may be shared between the chip carrier 2 and the printed circuit board 9. Or else, either part or the whole of the anode-connected resistor 27 can as well be built into the pre-amplifier circuit 10 to be formed as part of the pre-amplifier circuit 10. Where the pre-amplifier circuit 10 is structured as an IC, part or the whole the anode-connected resistor 27 is contained in the IC.

In the embodiment shown in FIG. 14, the cathode-connected resistor is formed of a printed resistor and the anode-connected resistor, of a printed resistor or a chip resistor. The choice of resistor types is not limited to this. Nor are the available types of resistors restricted to the printed resistor and the chip resistor, but other types can as well be use.

A PIN photodiode or an avalanche photodiode is used as the photo detector 1 in the embodiments described above. The usual material for the printed circuit board of the photo detector 1 is a semiconductor material such as Si, Ge or InP. For the chip carrier 2, it is required to use an insulator close to approximately 3 to 5 ppm/° C., which is the linear thermal expansion efficient of any of the photo detector materials mentioned above with a view to preventing the destruction or reliability deterioration of the photo detector 1 by thermal stress. Insulators meeting this requirement include alumina, aluminum nitride, glass-based materials and quartz-based materials. Although a ceramic printed circuit board is used as the printed circuit board 9 in the embodiments described above, a glass epoxy printed circuit board can as well be used if the transmission speed is low.

An optical signal receiver is configured by connecting at least are-timing circuit and a decision circuit to the optical signal receiving module described above. Also, an optical fiber communication apparatus can be configured of the optical signal receiving module and an optical signal transmission module for converting electrical signals into optical signals and supplying the converted signals, so that optical signals can be transmitted and received via optical fibers.

Any of the preferred embodiments of the invention described above permits evaluation of basic characteristics in a state in which the photo detector 1 is mounted on the chip carrier 2. It is further made possible, in accordance with the result of such evaluation, to flatten the frequency characteristic by reducing with the cathode-connected resistor 3 or the anode-connected resistor 4 peaking or dipping due to the LC resonance attributable to parasitic inductances within the module, increase the bandwidth and thereby secure a prescribed band. If the band is excessively wide, the bandwidth can be narrowed to an appropriate width using either the cathode-connected resistor 3 or the anode-connected resistor 4. Peaking and dipping can also be suppressed by grounding via the series resistor 12 the bypass capacitor 11 of the bias power supply to the photo detector, and excessive widening of the band can be prevented to keep the circuit noise components from increasing and thereby to prevent reception sensitivity from deterioration. This can also address fluctuations in the characteristics of the photo detector 1 and the pre-amplifier circuit 10.

Figure 1:
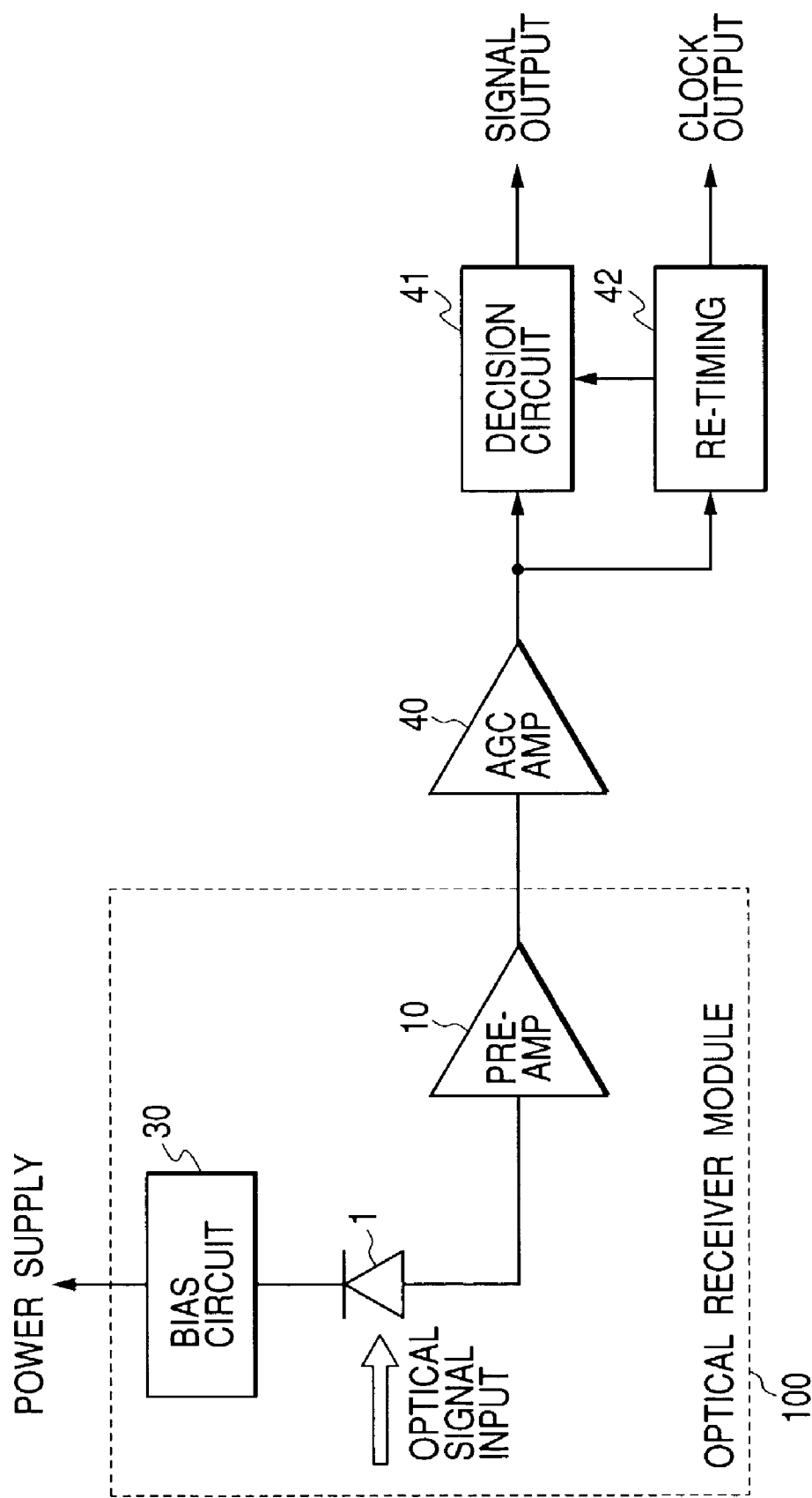
FIG. 1 is a block diagram illustrating an example of configuration of an optical signal receiver.

While every one of the embodiments described above is an optical signal receiving module, an optical signal receiver can be configured by connecting to any of the signal receiving modules according to the invention an AGC amplifier circuit for equalizing amplification, a decision circuit for digital conversion and a re-timing circuit for clock regeneration as shown in, for instance, FIG. 1 cited above. If an AGC amplifier circuit is included in the optical signal receiving module, an optical signal receiver can be configured by connecting to the optical signal receiving module a decision circuit and a re-timing circuit. Further by combining any of the optical signal receiving modules according to the invention and an optical signal transmission module having a configuration for converting electrical signals into optical signals and supplying the converted signals, an optical fiber communication apparatus is composed.

Any of the optical signal receiving modules, optical signal receivers and optical fiber communication apparatuses embodying the invention as described above has resistors in the respectively stated positions in the optical signal receiving module, the invention can as well be applied to a configuration in which impedances each consisting of a resistance component and a reactance component are provided in either all or some of those positions. Where impedances are to be provided, either impedance elements may be provided by themselves or impedance elements may be provided in conjunction with resistors.

The present invention can enable even an optical signal receiving module having unreduced parasitic elements to provide frequency characteristics free from peaking and dipping and having a necessary and sufficient band. It can also prevent reception sensitivity from deterioration.

What is claimed is:

1. An optical signal receiving module, comprising:
a photo detector for converting an optical signal into an electrical signal and outputting said electrical signal;
a pre-amplifier circuit for amplifying said electrical signals;
a first resistor for controlling a frequency band of said electrical signal to improve a frequency characteristic of at least an output of the pre-amplifier circuit;
a bias power supply circuit for photo detector for providing a bias voltage to said photo detector,
a bypass capacitor for forming a bypass circuit between said bias power supply for photo detector and a ground; and
a second resistor for adjusting the frequency band of signals within the module,
wherein said first resistor is connected to either or both of the anode side and the cathode side of said photo detector, and said second resistor is connected to said bypass capacitor in series.

2. An optical signal receiving module, comprising:
a photo detector which is mounted on a chip carrier and converts an optical signal into an electrical signal;
a pre-amplifier circuit which is mounted on a printed circuit board and amplifies said electrical signal;
a first resistor which controls a frequency band of said electrical signal to improve a frequency characteristic of at least an output of the pre-amplifier circuit;
a bias power supply circuit for photo detector which provides a bias voltage to said photo detector;
a bypass capacitor which forms a bypass circuit between said bias power supply for photo detector and a ground; and
a second resistor which adjusts a frequency band of said electrical signal,
wherein said first resistor is connected to either or both of the anode side and the cathode side of said photo detector and arranged on either or both of said chip carrier side and said printed circuit board, and said second resistor is connected to said bypass capacitor in series.

3. An optical signal receiving module, comprising:
a photo detector which converts an optical signal into an electrical signal;
a pre-amplifier circuit which amplifies said electrical signal;
a first impedance which controles a frequency band of said electrical signal to improve a frequency characteristic of at least an output of the pre-amplifier circuit;
a bias power supply circuit for photo detector which provides a bias voltage to said photo detector; a bypass capacitor which forms a bypass circuit between said bias power supply for photo detector and a ground; and
a second impedance which adjusts a frequency band of said electrical signal,
wherein said first impedance is connected to either or both of the anode side and the cathode side of said photo detector, and said second impedance is connected to said bypass capacitor in series.

* * * * *